United States Patent
Yahaya et al.

(10) Patent No.: US 11,007,492 B2
(45) Date of Patent: May 18, 2021

(54) AROMATIC CO-POLYIMIDE GAS SEPARATION MEMBRANES DERIVED FROM 6FDA-DAM-TYPE HOMO-POLYIMIDES

(71) Applicant: Saudi Arabian Oil Company, Dhahran (SA)

(72) Inventors: Garba Oloriegbe Yahaya, Dhahran (SA); Ali Hayek, Dhahran (SA); Abdulkarim Alsamah, Dhahran (SA); Ahmad Bahamdan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 179 days.

(21) Appl. No.: 16/287,474

(22) Filed: Feb. 27, 2019

(65) Prior Publication Data
US 2020/0269196 A1    Aug. 27, 2020

(51) Int. Cl.
*B01D 71/64* (2006.01)
*B01D 53/22* (2006.01)
(Continued)

(52) U.S. Cl.
CPC .......... *B01D 71/64* (2013.01); *B01D 53/228* (2013.01); *B01D 67/0013* (2013.01);
(Continued)

(58) Field of Classification Search
None
See application file for complete search history.

(56) References Cited

U.S. PATENT DOCUMENTS 4,705,540 A    11/1987  Hayes
4,717,393 A    1/1988   Hayes
(Continued)

FOREIGN PATENT DOCUMENTS

DE    10249480 A1    5/2004
EP    0554862 A1    8/1993
(Continued)

OTHER PUBLICATIONS

Niwa, S. et al., "Preparation of Novel Fluorinated Block Copolyimide Membranes for Gas Separations", Journal of Applied Polymer Science, 100, 2006, pp. 2436-2442. (Year: 2006).*
(Continued)

*Primary Examiner* — Jason M Greene
(74) *Attorney, Agent, or Firm* — Bracewell LLP; Constance G. Rhebergen; Kevin R. Tamm

(57) ABSTRACT

Co-polyimide membranes for separating components of sour natural gas including at least three distinct moieties polymerized together, the moieties including a 2,2'-bis(3,4-dicarboxyphenyl)hexafluoropropane dianhydride (6FDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

26 Claims, 6 Drawing Sheets

Homopolymer
6FDA-ABL-21

(51) Int. Cl.
  *B01D 67/00* (2006.01)
  *B01D 71/80* (2006.01)
  *C08G 73/10* (2006.01)
  *C10L 3/10* (2006.01)

(52) U.S. Cl.
  CPC ......... *B01D 71/80* (2013.01); *C08G 73/1067* (2013.01); *C10L 3/101* (2013.01); *C10L 3/104* (2013.01); *C10L 3/105* (2013.01); *C10L 2290/548* (2013.01)

(56) References Cited

U.S. PATENT DOCUMENTS

| | | | |
|---|---|---|---|
| 4,880,442 A | | 11/1989 | Hayes |
| 4,912,197 A | | 3/1990 | Hayes |
| 4,954,144 A | | 9/1990 | Burgoyne, Jr. et al. |
| 5,074,891 A | | 12/1991 | Kohn et al. |
| 5,085,676 A | * | 2/1992 | Ekiner .................. B01D 71/64 210/500.23 |
| 5,112,941 A | | 5/1992 | Kasai et al. |
| 5,202,412 A | | 4/1993 | Auman et al. |
| 5,234,471 A | | 8/1993 | Weinberg |
| 5,246,743 A | | 9/1993 | Kusuki et al. |
| 5,320,650 A | | 6/1994 | Simmons |
| 5,725,633 A | | 3/1998 | Ozcayir et al. |
| 6,562,110 B2 | | 5/2003 | Koros et al. |
| 7,109,140 B2 | | 9/2006 | Marand et al. |
| 8,075,824 B2 | | 12/2011 | Yoshinaga et al. |
| 8,192,524 B2 | | 6/2012 | Chinn et al. |
| 8,221,531 B2 | | 7/2012 | Wind et al. |
| 8,580,012 B2 | | 11/2013 | Hoshino et al. |
| 8,614,288 B2 | | 12/2013 | Liu et al. |
| 8,664,335 B2 | | 3/2014 | Koros et al. |
| 8,668,992 B2 | | 3/2014 | Hong et al. |
| 9,567,436 B2 | | 2/2017 | Liu |
| 9,718,923 B2 | | 8/2017 | Miller et al. |
| 9,733,522 B2 | | 8/2017 | Choi et al. |
| 9,962,646 B2 | | 5/2018 | Yahaya et al. |
| 2003/0220188 A1 | | 11/2003 | Marand et al. |
| 2011/0269915 A1 | | 11/2011 | Koros et al. |
| 2012/0202953 A1 | | 8/2012 | Suzuki et al. |
| 2014/0137735 A1 | | 5/2014 | Bhandari et al. |
| 2015/0005468 A1 | | 1/2015 | Osman et al. |
| 2016/0214067 A1 | * | 7/2016 | Miller .................. B01D 71/64 |
| 2017/0189850 A1 | * | 7/2017 | Yahaya .................. B01D 71/64 |
| 2017/0189866 A1 | | 7/2017 | Koros et al. |
| 2018/0345229 A1 | | 12/2018 | Yahaya et al. |

FOREIGN PATENT DOCUMENTS

| | | |
|---|---|---|
| WO | 02064242 A2 | 8/2002 |
| WO | 2018222815 A1 | 12/2018 |

OTHER PUBLICATIONS

Esekhile, O. et al., "Permeation of Butane Isomers through 6FDA-DAM Dense Films", J. Polym. Sci. partb: Polym. Phys.49 (2011) 1605-1620.

Qiu, L., Gas Separation Performance of 6FDA-Based Polyimides with Different Chemical Structures, Polymer 54 (2013) 6226-6235.

R. Wang, et al.; "A Critical Review on Diffusivity and the Characterization of Diffusivity of 6FDA-6FpDA Polyimide Membranes for Gas Separation", J. Membr.Sci.198 (2002) 259-271.

Invitation to pay additional fees and where applicable, protest fee dated May 26, 2020.

Kraftschik et al., "Dense film polyimide membranes for aggressive sour gas feed separations", Journal of Membrane Science, 2013, pp. 608-619, Elsevier.

Niiwa et al., "Preparation of Novel Fluorinated Block Copolyimide Membranes for Gas Separation", Journal of Applied Polymer Science, 2006, pp. 2436-2442, Wiley Periodicals, Inc.

Tien-Binh et al., "Polymer functionalization to enhance interface quality of mixed matrix membranes for high C02/CH4 gas separation",Journal of Materials Chemistry A, 2015, pp. 15202-15213, The Royal Society of Chemistry.

Wind et al., "Natural gas permeation in polyimide membranes", Journal of Membrane Science, 2004, pp. 227-236, Elsevier.

* cited by examiner

AROMATIC CO-POLYIMIDE GAS SEPARATION MEMBRANES DERIVED FROM 6FDA-DAM-TYPE HOMO-POLYIMIDES

BACKGROUND

Field

Embodiments of the disclosure relate to membranes and separations for hydrocarbons. In particular, embodiments of the disclosure show co-polyimide membranes for sour gas separations relating to natural gas.

Description of the Related Art

In recent years, certain interest in clean energy has increased, and world-wide demand for clean-burning natural gas is also rising. Natural gas consumption is likely to grow at a compounded annual growth rate of about 2.7% from about 2,600 Billion Cubic Meters (BCM) in 2005 to around 3,900 BCM in 2020. Based on 2006 estimates, natural gas has a reserve-to-production ratio of 61 years and a resource-to-production ratio of 133 years.

Raw natural gas varies greatly in composition depending on its extraction origin. Although methane constitutes the key component of raw natural gas, it may also contain considerable amounts of impurities including water, hydrogen sulfide ($H_2S$), carbon dioxide, nitrogen and other hydrocarbons. Natural gas (methane) is a main feedstock for the chemical industry, and with the potential growth in demand for natural gas, separation technologies with high efficiency are required in order to be able to exploit gas fields which are not yet commercially viable because of high contaminant contents.

Most of the gas reserves around the world are of low-quality with high contents of impurities, which include acid gas (carbon dioxide ($CO_2$) and hydrogen sulfide ($H_2S$)), water, heavy hydrocarbons ($C_3+$) and other contaminants such as helium, nitrogen, mercaptans etc. For natural gas to meet sales gas specifications, these contaminants, especially acid gas that constitutes the largest amount of impurity in many existing natural gas reserves, have to be removed. One requirement for natural gas sweetening processes involve the separation of acid gases from natural gas, and this treatment is important in order to prevent corrosion of transportation pipelines, reduce atmospheric pollution, and avoid other detrimental effects.

In some systems, the removal of acid gases occurs before the gas is delivered to pipelines or stored in portable cylinders as compressed natural gas. At high concentrations, acid gases can corrode transportation pipelines and have numerous other detrimental effects. Moreover, $H_2S$ is toxic and its combustion produces harmful $SO_2$ gas. Thus, sweetening of natural gas (removal of contaminants, such as for example $H_2S$) is needed to reduce pipeline corrosion, prevent atmospheric pollution, increase fuel heating value of natural gas, and decrease the volume of gas to be transported in pipelines and cylinders.

Presently, natural gas treatment and upgrading incorporates industrial gas separation processes. Examples of natural gas treatment technology that have been widely applied include absorption and adsorption of acid gases, such as for example through amine absorption processes and pressure swing adsorption (PSA), respectively. However, conventional technologies are associated with several problems, which include high energy requirements and high capital costs.

Absorption of acid gases in basic solvents, such as liquid amines and hot aqueous potassium carbonate solutions, and pressure swing adsorption (PSA) are examples of natural gas purification alternative technologies that are commercially available. However, a number of drawbacks to these processes exist as they rely upon energy-intensive thermal regeneration steps, large footprints, heavy maintenance requirements, and high capital costs.

The development of membrane materials for sour acid gas separations rarely has been studied. Studies that have been reported include studies on $H_2S/CH_4$ separation performance using rubbery polymeric membranes. However, since rubbery polymeric materials separate based on solubility selectivity, the $CO_2/CH_4$ separation capability of the rubbery polymeric membranes declines sharply and is much lower than other glassy polymers such as cellulose acetate (CA). Furthermore, the mechanical stability of rubbery polymers tends to fall to significantly less than that of glassy polymeric materials. Certain existing membranes require stringent pretreatment for water and heavy hydrocarbons content, as the membranes are very susceptible to swelling and plasticization in the presence of heavy hydrocarbons; benzene, toluene, and xylene (BTX); water; and other condensable gases.

Glassy polyimide is one type of polymeric membrane that has been investigated for acid gas separations from natural gas. These high glass transition temperature (Tg) (Tg>about 300° C.) materials develop certain acid gas separation capability based on size selectivity. Natural gas is usually treated at high pressures (up to and more than about 900 psi) and is typically saturated with heavy hydrocarbons ($C_{3+}$) and water vapor. Inadequate performance of current existing polymeric membranes impedes the full utilization of separation membranes on the industrial scale. Some of the challenges include inability to achieve both high permeability and selectivity, selectivity-permeability trade-off, membrane plasticization, and physical aging. These issues inhibit long-term gas separation performance and membrane stability. Thus, polymeric membrane materials with high permeation properties (i.e., both high permeability and selectivity) are necessary for the viability of membrane-based natural gas separations and membrane-absorption hybrid processes.

A variety of processes and techniques have been developed to separate and recover helium from multicomponent gas streams. Such processes include stand-alone membrane units, stand-alone cryogenic units and combinations of membrane units, cryogenic units and pressure swing adsorption (PSA) units. Stand-alone cryogenic processes have been used to produce crude helium at high recovery rates from natural gas or other streams containing low purity helium. When the concentration of helium in the feed drops to low levels; e.g., below about 1 mol. %, processes using stand-alone cryogenic units become inefficient and impractical. Helium is typically present in natural gas at below about 0.5 mol. % levels and is mostly extracted as crude helium across liquid natural gas (LNG) trains. World demand for helium is increasing, and this is expected to put pressure on production facilities as demand for high-purity helium products begins to outstrip supply. In light of these trends, processing methods that overcome the inefficient cryogenic process (especially at below 0.5 mol. % He in natural gas) are needed.

In order to enhance and optimize polyimide materials for gas separation membranes, further improvement of their properties is required, and this can be achieved by chemical modification of the polymers.

SUMMARY

Applicant has recognized that there is a need for efficient membrane separation apparatus, methods, and systems for selectively separating sour gas and unwanted components from sour natural gas feeds. The disclosure presents apparatus, methods, and systems applying membranes which show efficient, surprising, and unexpected separations of undesirable components from a sour natural gas feed. Unlike conventional technologies, membrane-based separations of the present disclosure do not exhibit drawbacks of conventional technology, as they are much more energy efficient, have less footprint, and are flexible in operation. Separation of helium from natural gas using high-performance membranes or combinations of membranes with any of the other processes described previously that achieve a satisfactorily high helium recovery can improve the efficiency of the separation processes.

Limited data have been reported on the development of membrane materials for aggressive sour gas separations. Embodiments of natural gas membrane separations of the present disclosure show surprising and unexpected advantages over commercially-available membranes, as aromatic block co-polyimides disclosed here provide superior efficiency, productivity, and resistance to penetrant-induced plasticization compared to cellulose acetate (CA), which is presently the industrial standard membrane material for CO2 separations. Embodiments disclosed here show polyimide membrane gas separation applications suitable for acid or sour gas feed separations and helium recovery from especially sub-quality natural gas using aromatic co-polyimide membranes derived from a 6FDA-DAM-type homo-polyimide. In addition, embodiments show advantageous performance of the newly-developed membranes under extreme and much more aggressive environments (i.e. high $H_2S$ content of up to about 5 vol. %, about 10 vol. %, about 15 vol. %, and about 20 vol. % and feed pressures of up to about 400 psig, about 500 psig, about 600 psig, about 700 psig, and about 800 psig for a gas mixture comprising $CO_2$, $CH_4$, $N_2$, $C_2H_6$ and $H_2S$). Prior art membranes are generally suitable for separations at low concentrations of $H_2S$ and low feed pressures.

Embodiments of the disclosure show membrane gas separation applications for acid gas feed separation and helium recovery from natural gas using newly-developed aromatic co-polyimide membranes derived from a 6FDA-DAM (4,4'-(hexafluoroisopylidene)diphthalic dianhydride-2,4,6-trimethyl-m-phenylenediamine) homo-polyimide. The membranes exhibit advantageous, surprising, and unexpected pure gas and gas mixture permeation properties. Pure gas $CO_2$ permeability in the range of about 105-118 Barrer and $CO_2/CH_4$ selectivity of up to about 40 were obtained at 35° C. and feed pressure of up to about 300 psig. Similarly, the pure gas He permeability in the range of about 132-170 Barrer and $He/CH_4$ selectivity of up to about 52 were obtained with the same experimental conditions.

Furthermore, the permeation properties of simulated sour gas mixtures consisting of 10, 57-59, 10, 1-3, and 20 vol. % of $CO_2$, $CH_4$, $N_2$, $C_2H_6$ and $H_2S$, respectively, through the membranes were studied, and membranes were subjected to up to a maximum of about 20 vol. % $H_2S$ in the feed gas mixture. The $CO_2/CH_4$ and $H_2S/CH_4$ ideal selectivities obtained for a random co-polyimide 6FDA-DAM/6FpDA (1:3 millimoles DAM:millimoles 6FpDA) were 29 and 19 respectively; while $CO_2$ and $H_2S$ permeabilities were 80 and 50 Barrers, respectively. Similarly for the random co-polyimide 6FDA-DAM/CARDO (1:3 millimoles DAM:millimoles CARDO), $CO_2/CH_4$ and $H_2S/CH_4$ ideal selectivities were 19 and 21, respectively, while $CO_2$ and $H_2S$ permeabilities were 48 and 51 Barrers, respectively.

The values and separation performances exhibited by the co-polyimides are advantageous as compared to the values obtained in some available high performance polymeric membranes. One important point to note is that at moderate feed pressure and up to 20 vol. % $H_2S$ in feed gas mixture, ideal selectivities and permeabilities are still suitable in the presently disclosed co-polyimides. Moreover, the $CO_2/CH_4$ selectivity of the co-polyimides does not degrade to anywhere near the same extent as reported for cellulose acetate (CA), even under more aggressive environments exemplified here. This stability at moderate pressures and high $H_2S$ concentration is impressive and unique, as well as surprising and unexpected.

Aromatic random and block co-polyimide membranes of the present disclosure can be developed from wide range of monomers including 4,4'-(hexafluoroisopropylidene) diphthalic dianhydride, also known as 2,2-bis(3,4-dicarboxyphenyl)-1,1,1,3,3,3-hexafluoropropane dianhydride (6FDA); benzophenone-3,3', 4,4'-tetracarboxylic dianhydride (BTDA); pyromellitic dianhydride (PMDA); 9,9-bis(4-aminophenyl)fluorene (CARDO); 4,4'-(hexafluoroisopropylidene)dianiline (6FpDA); 2,2'-bis(trifluoromethyl)benzidine (ABL-21); and 2,4,6-trimethyl-m-phenylenediamine (DAM) for forming random and different block length block polymers of, for example, 6FDA-DAM/CARDO; 6FDA-DAM/6FpDA; and 6FDA-DAM/ABL-21 co-polyimides.

In addition, the development of these aromatic co-polyimides can also be considered from other monomers that include 3,3'-dihydroxybenzidine, 3,3-(hexafluoroisopropylidene) dianiline, and other bulky diamines, forming such example copolymers as 6FDA-DAM/CARDO (3:1); 6FDA-DAM/CARDO (1:1); 6FDA-DAM/CARDO (1:3); (6FDA-DAM)/(6FDA-CARDO) (1,000-20,000)/(1,000-20,000); 6FDA-DAM/6FpDA (3:1); 6FDA-DAM/6FpDA (1:1); 6FDA-DAM/6FpDA (1:3); (6FDA-DAM)/(6FDA-6FpDA) (1,000-20,000)/(1,000-20,000); 6FDA-DAM/ABL-21 (3:1); 6FDA-DAM/ABL-21 (1:1); 6FDA-DAM/ABL-21 (1:3); (6FDA-DAM)/(6FDA-ABL-21) (1,000-20,000)/(1,000-20,000); (6FDA-DAM)/(6FDA-CARDO)/(6FDA-6FpDA); (6FDA-DAM)/(6FDA-ABL-21)/(6FDA-CARDO); (6FDA-ABL-21)/(6FDA-CARDO)/(6FDA-6FpDA); and combination thereof.

Crosslinking of the polymers can be achieved using different types and sizing of functional groups. Examples include and are not limited to functionalization or grafting with polar or $H_2S$-philic, in addition to or alternative to $CO_2$-philic, groups that include Bromine (Br); sulfonic acid ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, 1,3-cyclohexane-bis(methylamine) for example. In some embodiments of the present disclosure, including exemplified embodiments, crosslinking is not required and membrane formation is carried out without crosslinking or crosslinking agents.

In embodiments of the present disclosure, with respect to random co-polyimides a ratio (l:m) refers to a ratio of millimoles of a first non-FDA monomer: a second non-FDA monomer, for example in 6FDA-DAM/CARDO (1:3), a ratio of 1 millimole DAM to 3 millimoles CARDO. With respect to block co-polyimides a ratio of (l:m) or (l)/(m) refers to either block length 1 to block length m or a ratio of block length 1 to m, for example as shown in the copolymer of FIG. 1.

6FDA-based polyimides offer high rigidity, and tunable transport properties, due to versatile co-monomer choices and resultant chemical structures. In addition, some of the 6FDA-based polyimides have been found to be considerably more gas-selective than other glassy polymers with comparable permeabilities, and consistently deviate from the general relationship between permeability and permselectivity by showing systematically higher selectivities at values of permeability equivalent to other polymers.

Furthermore, the presence of fluorine in the 6FDA-based polyimides often lowers the thermal-expansion coefficient and gives increased solubility. One approach here is to introduce flexible linkages between the aromatic rings in the diamine and dianhydride. Modified polyimides with flexible bonds that provide improved solubility have been successfully utilized. Due to inhibited polymer chain packing and a rigid backbone, 6FDA-DAM is a permeable polyimide with moderate selectivity in some gas separation applications. 6FDA-DAM is especially useful for butane isomers separation and other cases requiring high flux.

Blending, surface modification, and copolymerization are methods used to tailor the properties of polymers. However, there are several limitations to some of these methods. For membrane applications, blending modifications would involve complicated phase behavior in membrane fabrication, as most polymers are immiscible. Even though membranes formed from crosslinked polyimides have improved environmental stability and superior gas selectivity compared to corresponding uncrosslinked polyimides, crosslinking reactions usually result in decreased solubility in organic solvents as well as very high glass-transition temperatures. These properties make the materials difficult to fabricate by means of conventional techniques.

To overcome these limitations, several kinds of structural modifications have been adopted. One direction was structural modifications of the polymer backbone including the addition of bulky lateral substituents, flexible alkyl side chains, non-coplanar biphenylene moieties, and kinked co-monomers. These methods have been utilized to modify the polymer properties, by lowering the inter-chain interactions and/or by reducing the stiffness of the polymer backbone. In addition, co-polyimides offer the possibility of preparing membranes with gas permeabilities and selectivities not obtainable with homo-polyimides and gas separation properties can be tailored by varying the monomer ratios.

With the above technical problems in mind, embodiments of the disclosure solve the problems as the aromatic block co-polyimides disclosed here frequently give superior efficiency, productivity and resistance to penetrant-induced plasticization compared to CA, which is presently the industrial standard membrane material for $CO_2$ separations. Among the polymers for gas separation membranes, these aromatic polyimides are one of the most attractive and promising materials due to their excellent properties such as high thermal stability, chemical resistance, and mechanical strength. These polymer properties help membrane structures made from co-polyimides to withstand deterioration due to the wet conditions often found with natural gas streams.

Co-polyimides exemplified here exhibit $CO_2/CH_4$ and $H_2S/CH_4$ ideal selectivities of up to 29 and 19, respectively; while $CO_2$ and $H_2S$ permeabilities are up to 80 and 50 Barrers, respectively for the random co-polyimide 6FDA-DAM/6FpDA (1:3). Similarly for the random co-polyimide 6FDA-DAM/CARDO (1:3), $CO_2/CH_4$ and $H_2S/CH_4$ ideal selectivities are up to 19 and 21 respectively, while $CO_2$ and $H_2S$ permeabilities are up to 48 and 51 Barrers respectively at moderate feed pressure and up to 20 vol. % $H_2S$ in a feed gas mixture. This performance is much higher than those obtained in many current commercial membranes. Moreover, the $CO_2/CH_4$ and $H_2S/CH_4$ selectivities of the co-polyimides do not degrade to anywhere near the same extent as was reported for CA and other commercial membranes, even under these much more aggressive environments applied here. Stability at moderate pressures and high $H_2S$ concentration is impressive, unique, surprising, and unexpected.

New 6FDA-DAM-type aromatic co-polyimide membranes show advantageous pure and gas mixture permeation properties for gas separations, particularly for sour gas feed separations from natural gas. These performances are unique and better than those of many industrially used glassy polymers. Many prior art membranes focus only on low $H_2S$ concentrations and low pressures, and in many cases no performance data in the presence of $H_2S$ are reported.

Currently, limited data have been reported on the development of membrane materials for aggressive sour gas separations. Embodiments of membranes disclosed here exhibit advantages over commercially available membranes, as the present aromatic co-polyimides provide superior selectivity, permeability, and resistance to penetrant-induced plasticization compared to CA, which is the presently the industrial standard membrane material for CO2 separations.

As noted, polyimides of the present disclosure are promising materials for natural gas separations, particularly with sour gas, due to their chemical, thermal, and mechanical stability. Polyimide-based membranes have been characterized for gas separation applications, particularly for $CO_2$ removal from gaseous streams. $CO_2$ removal technologies can be applied in natural gas sweetening and carbon capture technologies. Membrane-based natural gas separations of the present disclosure are advantageous due to their lower capital cost, higher energy savings, smaller size, being environmentally friendly, and being more economically viable as compared to conventional technologies such as stand-alone pressure swing adsorption (PSA) and stand-alone absorption processes.

In hexafluorodianhydride ("6FDA")-based polyimides, for example produced using 4,4'-(hexafluoroisopropylidene) diphthalic anhydride, the presence of a $CF_3$ group in the polymer results in chain stiffness, which causes certain membranes incorporating 6FDA to separate molecules based on steric bulk more effectively. The $CF_3$ group also leads to increased permeability due to inhibition of chain packing. As a result, 6FDA-based polyimides can exhibit greater selectivities and greater permeabilities that are within the same order of magnitude when compared to other high-performance polymers. As used herein throughout, the short-hand name of origin monomer units/moieties will be used to refer to final polymerized products, for example 6FDA-DAM/CARDO, even though for example certain oxygen atoms of the anhydride groups of 6FDA have been substituted with nitrogen atoms (see, for example, FIG. 1).

Additionally, gas separation performance of polyimides can be enhanced through copolymerization with other homo-polyimides. Co-polyimides have an advantage of producing membranes with gas permeabilities and selectivities that cannot be obtained with homo-polyimides. The disclosure provides unique materials for gas separation membrane applications, particularly for acid and sour gas feed separations from natural gas.

To minimize methane slippage, in some applications membranes need to exhibit consistent selectivities of $CO_2$/$CH_4$ and $H_2S$/$CH_4$ above 30 in wet sour gas with $H_2S$ concentration up to 20 mol. % at 900 psig, and in the presence of $C_{3+}$ heavy hydrocarbons (about 3 mol. %) and in the presence of Benzene, Toluene, and Xylene (BTX) at about 1,000 ppm. Membranes should also exhibit consistent permeances of 100 GPU (gas permeation units) for $CO_2$ and $H_2S$ in the previously-described conditions.

Therefore, disclosed here is a membrane for separating the components of a sour natural gas feed, the membrane comprising: at least three distinct moieties polymerized together, the moieties including a 2,2'-bis(3,4-dicarboxyphenyl)hexafluoropropane dianhydride (6FDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety. In some embodiments, the membrane comprises random co-polymers. In certain embodiments, the membrane comprises the 6FpDA based moiety. In other embodiments, the molar ratio of the 6FpDA based moiety to the DAM based moiety is between about 1:3 to about 3:1. Still in other embodiments, the membrane comprises the CARDO based moiety.

In certain embodiments, the molar ratio of the CARDO based moiety to the DAM based moiety is between about 1:3 to about 3:1. Still in other embodiments, the membrane comprises the ABL-21 based moiety. In some embodiments, the molar ratio of the ABL-21 based moiety to the DAM based moiety is between about 1:3 to about 3:1. In yet other embodiments, the membrane comprises block co-polymers. In certain embodiments of the block co-polymer, the membrane comprises the 6FpDA based moiety in addition to or alternative to the CARDO based moiety in addition to or alternative to the ABL-21 based moiety. In some embodiments, the block co-polymers include a polymer block of length L of the 6FDA and the DAM based moieties, and include a polymer block of length M of the 6FDA and the 6FpDA based moieties, and a block length ratio of L to M is about between (1,000-20,000) to (1,000-20,000). Still in other embodiments, the block co-polymers include a polymer block of length L of the 6FDA and the DAM based moieties, and include a polymer block of length M of the 6FDA and the CARDO based moieties, and a block length ratio of L to M is about between (1,000-20,000) to (1,000-20,000).

In certain embodiments, the block co-polymers include a polymer block of length L of the 6FDA and the DAM based moieties, and include a polymer block of length M of the 6FDA and the ABL-21 based moieties, and a block length ratio of L to M is about between (1,000-20,000) to (1,000-20,000).

Additionally disclosed is a method of gas separation, the method comprising the step of: applying either the block or random co-polymer membrane to separate at least 2 components of a mixed gas stream. In some embodiments, feed pressure of the mixed gas stream to a feed side of the membrane is up to about 500 psig, about 800 psig, or about 900 psig and $H_2S$ content of the mixed gas stream is up to about 20 volume percent. Still in other embodiments, the mixed gas stream comprises $CO_2$, $CH_4$, $N_2$, $C_2H_6$, and $H_2S$.

Additionally disclosed here is a method for making a membrane for separating components of a sour natural gas feed, the method comprising the steps of: combining at least three different monomers to form a co-polyimide, the monomers including 2,2'-bis(3,4-dicarboxyphenyl)hexafluoropropane dianhydride (6FDA); 2,4,6-trimethyl-m-phenylenediamine (DAM); and at least one component selected from the group consisting of: 4,4'-(hexafluoroisopropylidene)dianiline (6FpDA); 9,9-bis(4-aminophenyl) fluorene (CARDO); 2,3,5,6-tetramethyl-1,4-phenylenediamine (durene diamine); 2,2'-bis(trifluoromethyl)benzidine (ABL-21); 3,3'-dihydroxybenzidine; and 3,3'-(hexafluoroisopropylidene)dianiline; and preparing a dense film from the co-polyimide using a solution casting process.

In some embodiments, the method includes the step of using the dense film to separate components of a gas stream. In some embodiments, the step of combining is carried out to create random co-polymers. Still in other embodiments, the step of combining includes combining the 6FDA, the DAM, and the 6FpDA. In certain embodiments, the molar ratio of the DAM to the 6FpDA is between about 1:3 to about 3:1. In still other embodiments, the step of combining includes combining the 6FDA, the DAM, and the CARDO. In yet other embodiments, the molar ratio of the DAM to the CARDO is between about 1:3 to about 3:1. In some embodiments, the step of combining includes combining the 6FDA, the DAM, and the ABL-21. Still in other embodiments, the molar ratio of the DAM to the ABL-21 is between about 1:3 to about 3:1.

In some embodiments of the method, the step of combining is carried out to create block co-polymers. Still in other embodiments, the step of combining to create block polymers includes combining the 6FDA, the DAM, and the 6FpDA. In some embodiments, the step of combining to create block polymers includes combining the 6FDA, the DAM, and the CARDO. In yet other embodiments, the step of combining to create block polymers includes combining the 6FDA, the DAM, and the ABL-21.

Additionally disclosed is a membrane for separating the components of a sour natural gas feed, the membrane comprising: a 2,2'-bis(3,4-dicarboxyphenyl)hexafluoropropane dianhydride (6FDA) based moiety and a 2,2'-bis(trifluoromethyl)benzidine (ABL-21) based moiety.

Additionally disclosed is a membrane for separating the components of a sour natural gas feed, the membrane comprising: at least three distinct moieties polymerized together, the moieties including a dianhydride selected from the group consisting of: a 2,2'-bis(3,4-dicarboxyphenyl) hexafluoropropane dianhydride (6FDA) based moiety; a benzophenone-3,3', 4,4'-tetracarboxylic dianhydride (BTDA) based moiety; and a pyromellitic dianhydride (PMDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
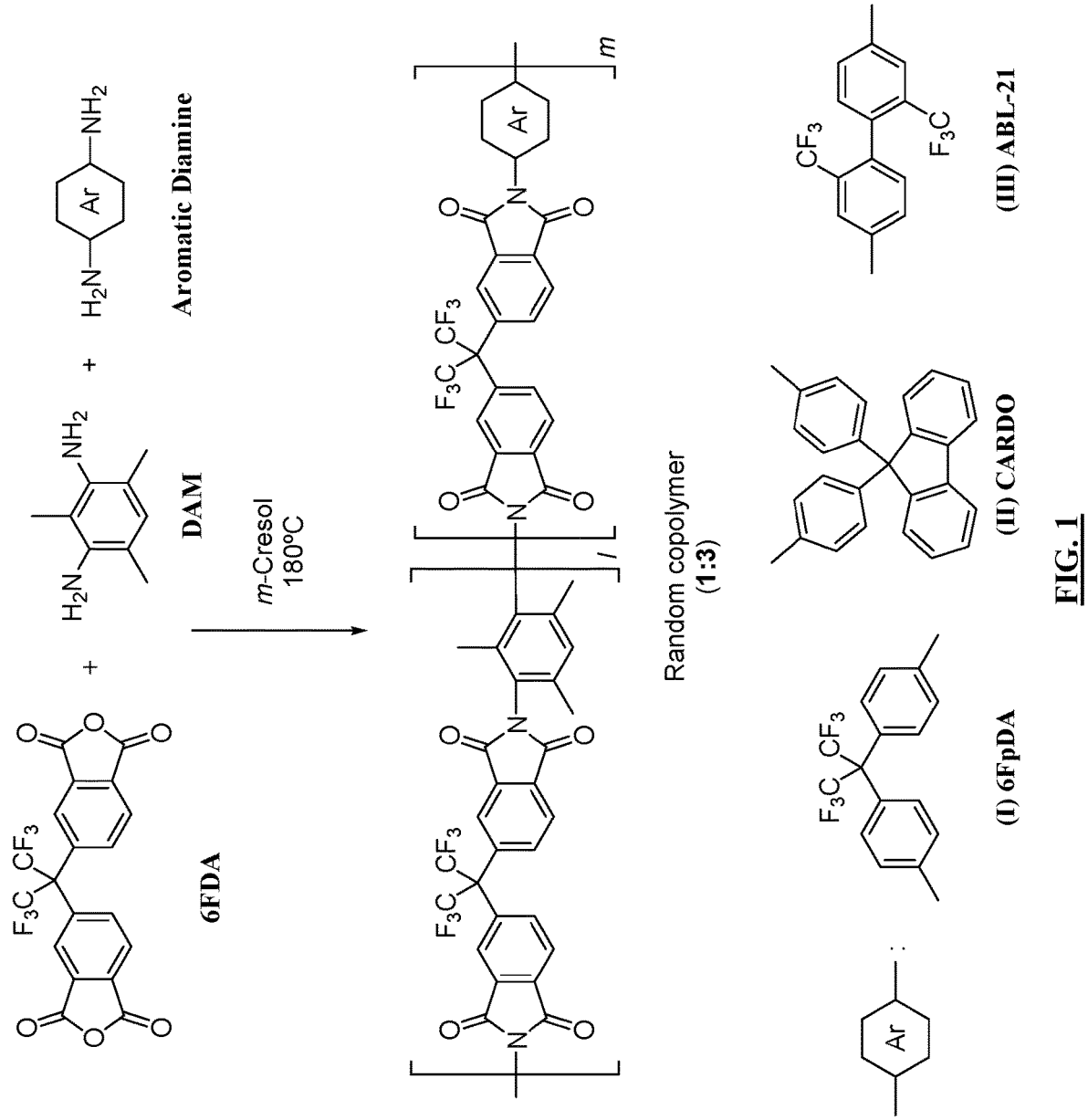
FIG. 1 is a reaction scheme for the production of random co-polymers: 6FDA-DAM/6FpDA (1:3), 6FDA-DAM/CARDO (1:3); and 6FDA-DAM/ABL-21 (1:3).

So that the manner in which the features and advantages of the embodiments of apparatus, systems, and methods for 6FDA-DAM homo-polyimide-based co-polyimide membranes for sour gas feed separations from natural gas, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The present disclosure exemplifies co-polyimide membranes useful for acid gas separations and helium recovery. In order to enhance separation performance and optimize co-polyimides for gas separations, chemical modifications can be made, which include substitution of other pertinent moieties and bulky functional groups in the co-polyimide backbone. These modification steps can significantly improve the performance of co-polyimide membranes. Thus, the development of aromatic co-polyimides can be considered from other monomers with and without, or in the absence of, crosslinking.

Transport properties of pure gases and gas mixtures through dense polymeric membranes are governed by the solution-diffusion mechanism. According to this model, gas permeation follows a three-step process, which is gas dissolution in the upstream side of the membrane, diffusion down a concentration gradient through the membrane, and desorption from the downstream side of the membrane. From this, the volumetric (molar) flux of a component i, $J_i$, through the membrane is given by equation (1):

$$J_i = \frac{D_i S_i (p_{i(o)} - p_{i(l)})}{l} = \frac{P_i (p_{i(o)} - p_{i(l)})}{l} \quad \text{Eq. (1)}$$

where l is membrane thickness [cm], $p_{i(o)}$ is the partial pressure of component i at the feed side of the membrane, $p_{i(l)}$ is the partial pressure of component i at permeate side, $D_i$ is the diffusion coefficient [cm$^2$/s], and $S_i$ is the solubility coefficient [cm$^3$ (STP) of penetrant gas/cm$^3$ of polymer per pressure]. The product of diffusion and solubility coefficients ($D_i$ $S_i$) is called the membrane permeability of component i, $P_i$, which indicates the ability of a membrane to permeate gases based on their membrane solubility and diffusivity differences. Barrer is the conventional unit of permeability, where 1 Barrer=10$^{-10}$ (cm$^3$(STP)×cm)/(cm$^2$×s×cmHg).

The pure gas permeability coefficient, especially at low pressures, can be calculated using equation 2.

$$P_i = D_i S_i = \frac{j_i \cdot l}{p_{i(o)} - p_{i(l)}} \quad \text{Eq. (2)}$$

The permeability coefficient of each gas component in the gas mixture, especially at low pressures, can be determined from the equation 3.

$$P_i = \frac{x_{i(l)} J_i \cdot l}{(P_f x_{i(o)} - P_p x_{i(l)})} \quad \text{Eq. (3)}$$

where $x_{i(o)}$ and $x_{i(l)}$ are the mole fractions of the gas components in the feed and permeate streams respectively, $J_i$ is the volumetric (molar) flux of a component i (cm$^3$/(cm$^2$×s)), and $p_f$ and $p_p$ are the pressures (cmHg absolute) on the feed and permeate side of the membrane respectively.

The ability of the membrane to separate two components is called the ideal selectivity or permselectivity, $\alpha_{ij}$, which is represented by the ratio of permeability of the more permeable component i to that of the less permeable component j through the membrane as shown in equation (4).

$$\alpha_{ij} = \frac{P_i}{P_j} = \frac{S_i}{S_j} \times \frac{D_i}{D_j} \quad \text{Eq. (4)}$$

where $$\frac{S_i}{S_j} \text{ and } \frac{D_i}{D_j}$$

are the solubility selectivity and diffusivity selectivity of two gases, respectively. These terms represent the relative solubility and mobility of two gases in the membrane.

In a gas mixture, however, the separation factor, $\alpha^m_{i/j}$, is often used, which is typically used to measure separation efficiency and this is conventionally given as:

$$\alpha^m_{i/j} = \frac{x_{i(l)} / x_{j(l)}}{x_{i(o)} / x_{j(o)}} \quad \text{Eq. (5)}$$

where $x_{i(o)}$ and $x_{i(l)}$ are the mole fractions of the gas component i in the feed and permeate streams respectively; and $x_{j(o)}$ and $x_{j(l)}$ are the mole fractions of the gas component j in the feed and permeate streams respectively. For non-ideal gas mixtures, however, a more appropriate alternative measure of permselectivity is used to reflect the properties of the membrane material, $\alpha^{m,*}_{i/j}$. This permselectivity is the ratio of the mixed gas permeabilities of components i and j, as determined using the fugacity driving force definition of permeability. Thus $$\alpha_{i/j}^{m,*} = \frac{P_i^*}{P_j^*}$$  Eq. (6)

where $P_i^*$ and $P_j^*$ are the mixed gas fugacity-based permeabilities of component i and j. Equation (6) is used in this study to calculate the permselectivity of each component in the gas mixtures. The permeation properties of gases through dense polymeric membranes are also affected by variation in operating temperatures and its influence can be described by the Van't Hoff-Arrhenius equation as given below in equation (7).

$$P = P_0 \exp\left(\frac{-E_p}{RT}\right)$$  Eq. (7)

$P_0$ is the pre-exponential factor [Barrer], R is the universal gas constant [$8.314 \times 10^{-3}$ kJ/(mol×K)], T is the absolute temperature [K], and $E_p$ is the activation energy of permeation [kJ/mol].

Aromatic co-polyimide membranes derived from a 6FDA-DAM homo-polyimide exhibit advantageous gas and gas mixture permeation properties. Aromatic random and block co-polyimide membranes can be developed from wide range of commercially available monomers including 4,4'-(hexafluoroisopropylidene) diphthalic dianhydride, also known as 2,2'-bis(3,4-dicarboxyphenyl)hexafluoropropane dianhydride, (6FDA); benzophenone-3,3',4,4'-tetracarboxylic dianhydride (BTDA); pyromellitic dianhydride (PMDA); 9,9-bis(4-aminophenyl)fluorene (CARDO); 4,4'-(hexafluoroisopropylidene)dianiline (6FpDA); 2,2'-Bis(trifluoromethyl)benzidine (ABL-21); and 2,4,6-trimethyl-m-phenylenediamine (DAM) to form different random and a variety of block length polymers of 6FDA-DAM/CARDO; 6FDA-DAM/6FpDA; and 6FDA-DAM/ABL-21 co-polyimides.

In addition, the development of these aromatic co-polyimides can also be considered from other monomers including, but not limited to, 3,3'-dihydroxybenzidine, 3,3'-(hexafluoroisopropylidene) dianiline, and others. Certain example polymers can include co-polymers such as 6FDA-DAM/CARDO (3:1); 6FDA-DAM/CARDO (1:1); 6FDA-DAM/CARDO (1:3); (6FDA-DAM)/(6FDA-CARDO) (1,000-20,000)/(1000-20,000); 6FDA-DAM/6FpDA (3:1); 6FDA-DAM/6FpDA (1:1); 6FDA-DAM/6FpDA (1:3); (6FDA-DAM)/(6FDA-6FpDA) (1,000-20,000)/(1,000-20,000); 6FDA-DAM/ABL-21 (3:1); 6FDA-DAM/ABL-21 (1:1); 6FDA-DAM/ABL-21 (1:3); (6FDA-DAM)/(6FDA-ABL-21) (1000-20,000)/(1000-20,000); (6FDA-DAM)/(6FDA-CARDO)/(6FDA-6FpDA); (6FDA-DAM)/(6FDA-ABL-21)/(6FDA-CARDO); (6FDA-ABL-21)/(6FDA-CARDO)/(6FDA-6FpDA) and combination thereof.

Crosslinking of the polymers can be achieved using different types and sizing of functional groups. Examples include and are not limited to functionalization or grafting with polar or $H_2S$-philic, in addition to or alternative to $CO_2$-philic, groups that include Bromine (Br); sulfonate ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, 1,3-cyclohexane-bis(methylamine) for example.

The disclosure provides certain relationships between the permeabilities and component ratios of the 6FDA-DAM homo-polyimide and other monomer moieties. One reason for choosing the homo-polyimide 6FDA-DAM is that it has a greater permeability, but a relatively low selectivity for a specific gas pair, while other monomer moieties have higher selectivity with a relatively low permeability. Co-polyimides with improved permeability and selectivity have been developed. Embodiments allow for enhancement in gas separation properties. Physical and gas transport properties of certain membranes are examined by investigating properties of pure and mixed gases, consisting of $CO_2$, $CH_4$, $N_2$, $C_2H_6$, He and $H_2S$, passing through the dense films of the co-polyimides 6FDA-DAM/CARDO; 6FDA-DAM/6FpDA; and 6FDA-DAM/ABL-21 allowing for simultaneous separation of $CO_2$, $N_2$, He, and $H_2S$ from natural gas streams.

EXAMPLES

The following examples are given for the purpose of illustrating embodiments of the present invention, however, it is to be understood that these examples are merely illustrative in nature, and that the process embodiments of the present invention are not necessarily limited thereto.

Figure 2:
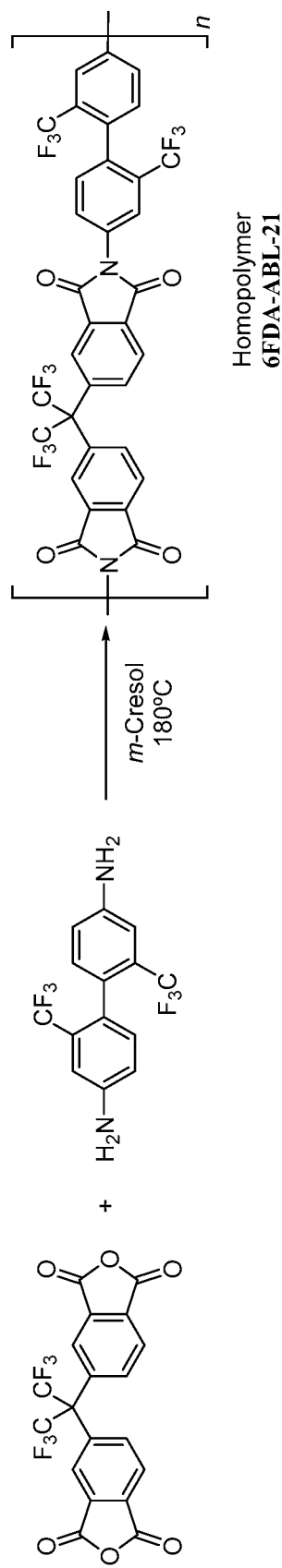
FIG. 2 is a reaction scheme for the homo-polymer (homo-polyimide) 6FDA-ABL-21, which has been characterized and studied.

Exemplified co-polyimides were synthesized by a one-step method in m-cresol by keeping the co-monomers 6FDA and DAM constant, while varying a second diamine co-monomer from 6FpDA to CARDO then ABL-21 as depicted in FIG. 1. Reactions were carried out at high temperature (180° C.) in a 100-mL three neck round bottomed flask equipped with a Dean-Stark apparatus, an IKA® EUROSTAR 20 digital mechanical stirrer under a nitrogen atmosphere. The Dean-Stark apparatus was used to remove water formed during the reaction in order to drive the reaction toward the formation of the co-polyimide. Separately and specifically, a 6FDA-ABL-21 homo-polyimide has been prepared, characterized, and the gas transport properties studied. FIG. 2 is a reaction scheme for the home-polymer 6FDA-ABL-21, which has been characterized and studied.

Three random co-polymers were prepared by adding the dianhydride monomer 6FDA to a mixture that contained both diamine co-monomers (DAM, in addition to 6FpDA, CARDO, or ABL-21) in m-cresol and the temperature was then increased to 180° C. for 8 hours. In all cases the molar ratios DAM:6FpDA, DAM:CARDO and DAM:ABL-21 was fixed to 1:3 to allow a comparative study between the three co-monomers 6FpDA, CARDO, and ABL-21.

Example 1: Preparation of Aromatic Random Co Polyimide 6FDA-DAM/6FpDA (1:3)

Random aromatic 6FDA-DAM/6FpDA (1:3) co-polyimide (FIG. 3) was synthesized according to the following procedure from 2,2'-bis-(3,4-dicarboxyphenyl) hexafluoropropane dianhydride (6FDA) (obtained from Alfa Aesar), 2,4,6-trimethyl-m-phenylenediamine (DAM) (obtained from TCI America), and 4,4'-(hexafluoroisopropylidene) dianiline (6FpDA) (obtained from TCI America). The solvents used include Methanol (obtained from ThermoFisher Scientific) and m-cresol (obtained from Alfa Aesar). All the chemicals and solvents used in this work were used as received without any further purification.

Synthesis of random co-polyimide 6FDA-DAM/6FpDA (1:3) (I): In a 100-mL three-neck round bottom flask equipped with a nitrogen inlet and a mechanical stirrer DAM (0.300 g, 1.994 mmol), 6FpDA (2.00 g, 5.98 mmol), and 6FDA (3.54 g, 7.98 mmol) were mixed in m-cresol (16.00 ml). The mixture was heated at 180° C. for 8 hours. The solution was diluted with additional 10 mL of m-cresol while still hot and the resulting highly viscous solution was poured into methanol. The fibrous polymer obtained was stirred in methanol overnight, then filtered and dried partially. The solid polymer was washed twice (2×300 mL) with methanol over two days. The final product 6FDA-DAM/6FpDA (1:3) (5.15 g, 3.87 mmol, 97% yield) was filtered off then dried under reduced pressure at 150° C. for two days. Characterization results showed the following: $^1$H NMR (500 MHz, CDCl$_3$) $\delta_H$ 8.14-7.78 (m, 24H, ArH$_{6FDA}$), 7.64-7.44 (AB system, J$_{AB}$=8.4 Hz, 24H, ArH$_{6FpDA}$), 7.24 (br s, 1H, ArH$_{DAM}$), 2.21 (s, 6H, —CH$_{3DAM}$), 1.97 (s, 3H, —CH$_{3DAM}$).

One of ordinary skill in the art will understand that in order to synthesize a block, rather than random, co-polyimide, 6FDA and DAM could be first combined to create a block of (6FDA-DAM) and then 6FDA and 6FpDA could be combined with each other and together with the block of (6FDA-DAM) to create block (6FDA-DAM)/(6FDA-6FpDA) of varying chain length for example (1,000-20,000)/(1,000-20,000).

Example 2: Preparation of Aromatic Random Co Polyimide 6FDA-DAM/CARDO (1:3)

Random aromatic 6FDA-DAM/CARDO (1:3) co-polyimide was synthesized according to the following procedure from 6FDA (obtained from Alfa Aesar), DAM (obtained from TCI America) and CARDO (obtained from TCI America). The solvents used included methanol (obtained from ThermoFisher Scientific) and m-cresol (obtained from Alfa Aesar). All the chemicals and the solvents used in this work were used as received without any further purification.

Synthesis of random co-polyimide 6FDA-DAM/CARDO (1:3) (II): A similar procedure for preparing co-polyimide (I) was employed using the following amounts of starting materials: DAM (0.287 g, 1.913 mmol), CARDO (2.00 g, 5.74 mmol), and 6FDA (3.40 g, 7.65 mmol) in m-cresol (15.00 ml). The final product 6FDA-DAM/CARDO (1:3) (II) (4.65 g, 3.46 mmol, 90% yield) was obtained as a white off solid material. Characterization resulted in the following: $^1$H NMR (500 MHz, CDCl$_3$) $\delta_H$ 8.05-7.81 (m, 24H, ArH$_{6FDA}$), 7.79 (d, J=7.4 Hz, 6H, ArH$_{CARDO}$), 7.45 (d, J=7.4 Hz, 6H, ArH$_{CARDO}$), 7.41-7.28 (m, 24H, ArH$_{CARDO}$), 7.23 (br s, 1H, ArH$_{DAM}$), 2.21 (s, 6H, —CH$_{3DAM}$), 1.97 (s, 3H, —CH$_{3DAM}$).

Example 3: Preparation of Aromatic Random Co Polyimide 6FDA-DAM/ABL-21 (1:3)

Random aromatic 6FDA-DAM/ABL-21 co-polyimide was synthesized according to the following procedure from 6FDA (obtained from Alfa Aesar), DAM (obtained from TCI America) and ABL-21 (obtained from TCI America). The solvents used included methanol (obtained from ThermoFisher Scientific) and m-cresol (obtained from Alfa Aesar). The chemicals and the solvents used in this work were used as received without any further purification.

Synthesis of random co-polyimide 6FDA-DAM/ABL-21 (1:3) (III): A similar procedure for preparing co-polyimide (I) was employed using the following amounts of starting materials: DAM (0.383 g, 2.55 mmol), ABL-21 (2.45 g, 7.65 mmol), and 6FDA (4.53 g, 10.20 mmol) in m-cresol (20.00 ml). The final product 6FDA-DAM/ABL-21 (1:3) (III) (6.38 g, 4.84 mmol, 95% yield) was obtained as a white solid product. Characterization of the product resulted in the following: $^1$H NMR (500 MHz, CDCl$_3$) $\delta_H$ 8.14-7.87 (m, 30H, ArH$_{6FDA}$, ArH$_{ABL-21}$), 7.74 (d, J=7.2 Hz, 6H, ArH$_{ABL-21}$), 7.51 (d, J=7.5 Hz, 6H, ArH$_{ABL-21}$), 7.25 (br s, 1H, ArH$_{DAM}$), 2.22 (s, 6H, —CH$_{3DAM}$), 1.98 (s, 3H, —CH$_{3DAM}$).

Example 4: Synthesis of Homo-Polyimide 6FDA-ABL-21

In a 100-mL three-neck round bottom flask equipped with a nitrogen inlet and a mechanical stirrer, ABL-21 (2.44 g, 7.62 mmol) and 6FDA (3.55 g, 8.00 mmol) were dissolved in m-cresol (15 ml), and the mixture was heated at 180° C. for 8 hours. The solution was diluted with an additional 10 mL of m-cresol while still hot and the resulting highly viscous solution was poured into methanol. The fibrous polymer obtained was stirred in methanol overnight, then filtered and dried partially. The solid polymer was washed twice (2×400 mL) with methanol over two days. The final product 6FDA-ABL-21 (5.5 g, 7.25 mmol, 95% yield) was filtered off then dried under reduced pressure at 150° C. for two days. Characterization resulted in the following (see FIG. 2): $^1$H NMR (500 MHz, CDCl$_3$) $\delta_H$ 8.12 (d, J=8.0 Hz, 2H, ArH$_{6FDA}$), 8.01 (s, 2H, ArH$_{6FDA}$), 7.94 (m, 4H, ArH$_{6FDA}$, ArH$_{ABL-21}$), 7.74 (d, J=8.6 Hz, 2H, ArH$_{ABL-21}$), 7.51 (d, J=8.3 Hz, 2H, ArH$_{ABL-21}$).

$^1$H-NMR Analysis

Figure 3:
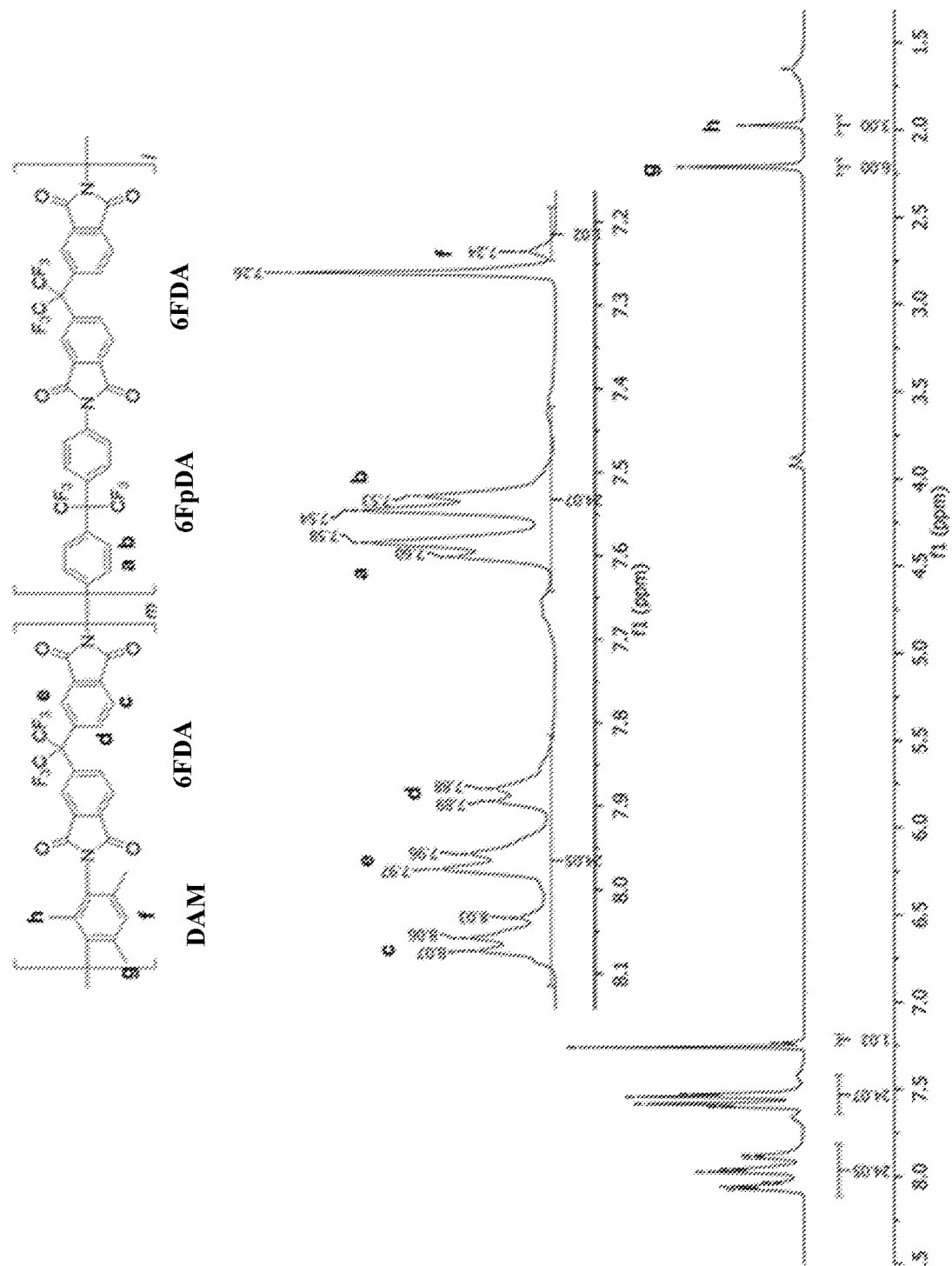
FIG. 3 shows the $^1$H NMR spectrum of random co-polyimide 6FDA-DAM/6FpDA (1:3) in CDCl$_3$.

The chemical structures of the prepared co-polyimides were confirmed by $^1$H nuclear magnetic resonance (NMR) analysis in deuterated chloroform (CDCl$_3$). FIG. 3 shows the $^1$H NMR spectrum of random co-polyimide 6FDA-DAM/6FpDA (1:3) as a model spectrum for the prepared co-polyimides. The spectrum shows the presence of the corresponding peaks of 6FpDA (a and b), 6FDA (c, d and e) and DAM (f, g and h). The signal integration of the corresponding peaks of the aromatic protons of 6FpDA (7.59 ppm and 7.54 ppm, a and b) and that of the methylene groups (—CH$_3$) of DAM (1.97 ppm, h) were used to validate the expected molar ratio between the two co-monomers in the co-polyimide backbone. For a 1:3 DAM:6FpDA molar ratio, the integration of the corresponding DAM and 6FpDA peaks should account for 3 and 24 protons (3×8 protons) respectively, which is clearly shown in the spectrum in FIG. 3. Thus, the DAM:6FpDA molar ratio is confirmed to be 1:3 as desired.

In a similar way, the DAM:CARDO and DAM:ABL-21 molar ratios in the other prepared co-polyimides were determined using the same methodology of signal integrations (refer to the $^1$H NMR signal integration assignments in the experimental section).

Fourier-Transform Infrared (FTIR) Spectroscopy Analysis

Figure 4A:
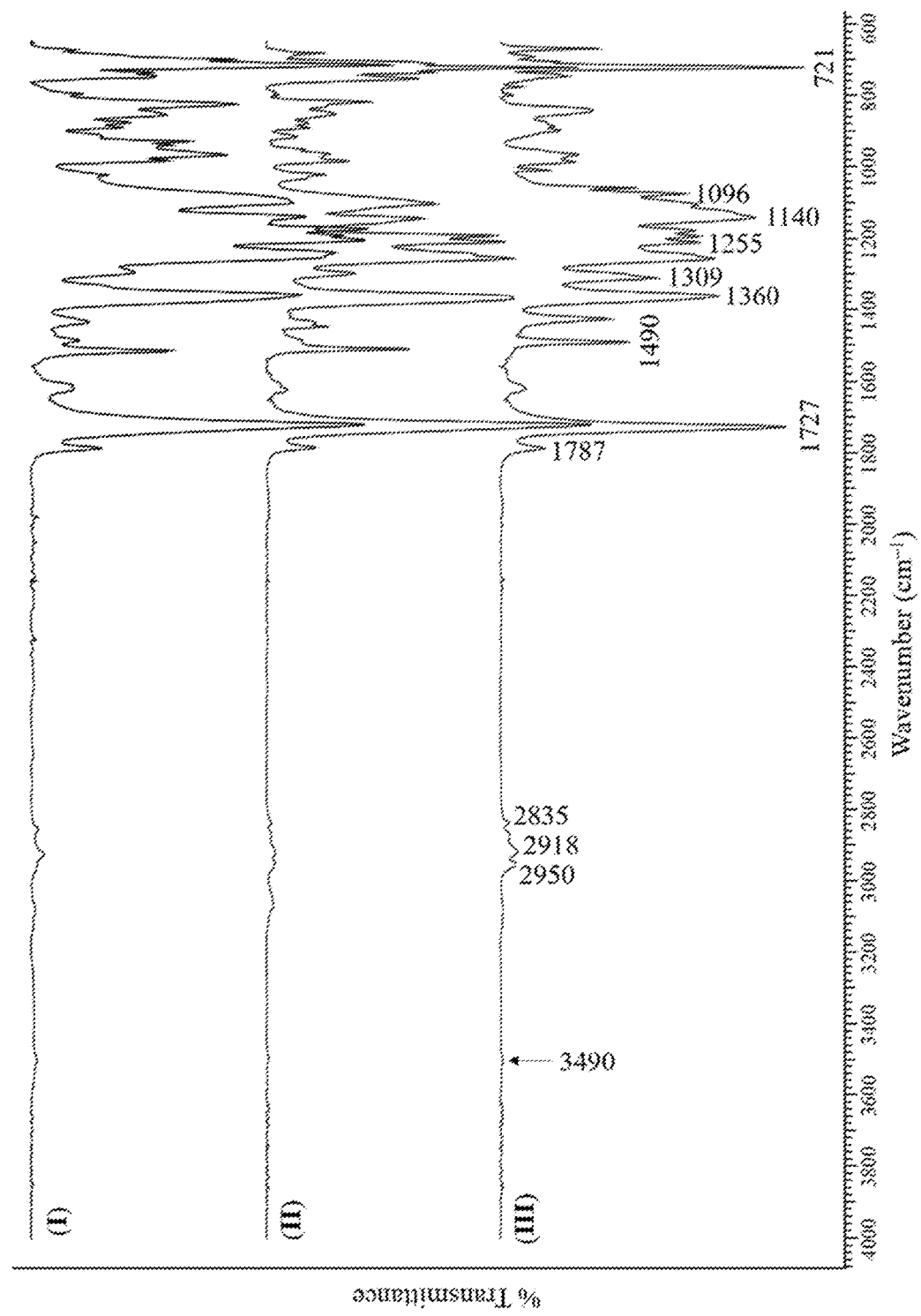
FIG. 4A shows Fourier Transform Infrared (FTIR) spectra of prepared co-polyimides: (I) 6FDA-DAM/6FpDA (1:3); (II) 6FDA-DAM/CARDO (1:3); and (III) 6FDA-DAM/ABL-21 (1:3).

A complete one-step imidization and the structure of the prepared co-polyimides was confirmed from their FTIR spectra depicted in FIG. 4A. FIG. 4A shows Fourier Transform Infrared (FTIR) spectra of prepared co-polyimides: (I) 6FDA-DAM/6FpDA (1:3); (II) 6FDA-DAM/CARDO (1:3); and (III) 6FDA-DAM/ABL-21 (1:3).

Complete imidization is confirmed from the absence of any peaks that correspond to the intermediate species which contains amide functional groups (3500-3100 cm$^{-1}$ and 1700-1650 cm$^{-1}$). Moreover, as an indication to a relatively high molecular weight of the prepared co-polyimides is a very weak absorption band at 3490 cm$^{-1}$, which can be attributed to the peripheral amine groups (N—H bond) of the polymeric chains.

Asymmetric and symmetric stretching of the carbonyl groups (C=O, imide I and II bands) are illustrated in the two absorption bands at 1787 cm$^{-1}$ and 1727 cm$^{-1}$, respectively. The C—N bond stretching (imide III band) absorption band is illustrated at 1360 cm$^{-1}$. Strong multiple vibration peaks at 1257-1190 cm$^{-1}$ can be attributed to the —CF$_3$ groups of the 6FDA, 6FpDA and ABL-21 moieties.

Peaks are less intense in the case of 6FDA-DAM/CARDO, since the only source of —CF$_3$ groups is the 6FDA in contrast to the other copolymers 6FDA-DAM/6FpDA and 6FDA-DAM/ABL-21, where the —CF$_3$ groups exist in addition to 6FDA in 6FpDA and ABL-21 respectively. The absorption band at 3074 cm$^{-1}$ is attributed to the aromatic C—H stretching, however, the aliphatic C—H stretching and bending are confirmed by the presence of the absorption bands at 2950-2835 cm$^{-1}$ and 1517 cm$^{-1}$ respectively. The aliphatic C—H bonds correspond to the methyl groups of DAM.

Figure 4B:
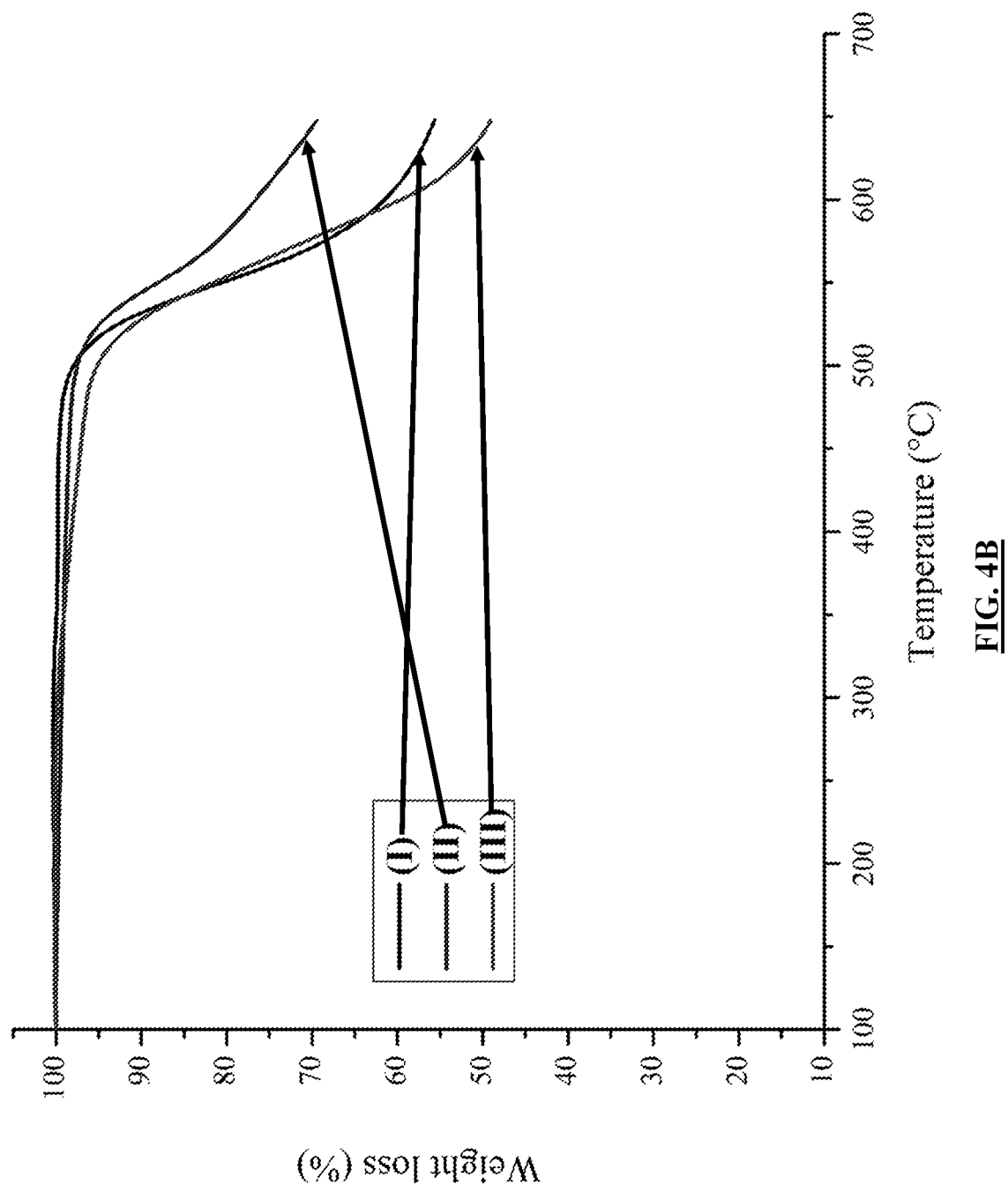
FIG. 4B shows thermal analysis of the prepared co-polyamides represented by a thermogravimetric analysis (TGA) plot.
Figure 4C:
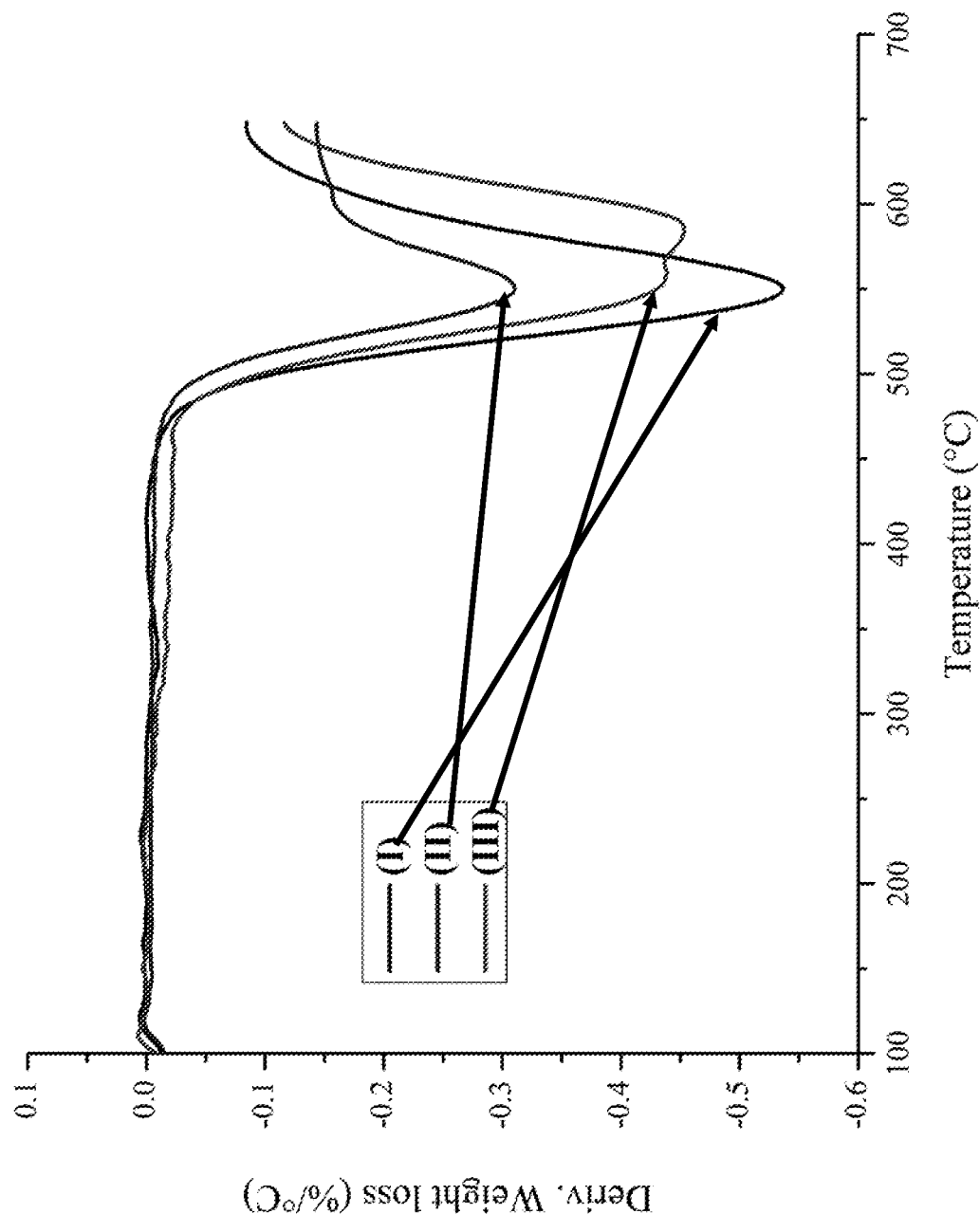
FIG. 4C shows a derivative thermogravimetric chart based on the data from FIG. 4B.

FIG. 4B shows thermal analysis of the prepared co-polyimides represented by a thermogravimetric analysis (TGA) plot. FIG. 4C shows a derivative thermogravimetric (DTG) chart based on the data from FIG. 4B.

The temperatures corresponding to 5% and 10% weight losses are listed in Table 1. These values are reported as an indication to the co-polyimides' thermal stability. The TGA traces were recorded within a temperature range between 100° C. and 650° C. at a rate of 10° C./min. The temperatures corresponding to the fastest rate of decomposition taken from the DTG curves of the prepared co-polyimide membranes are also listed in Table 1.

TABLE 1

Characteristic temperatures for TGA and DTG.

| Co-polyimide membrane | TGA (° C.) | | DTG (° C.) | Tg (° C.) |
| --- | --- | --- | --- | --- |
|  | $T_{d5\%}$ | $T_{d10\%}$ | | |
| 6FDA-DAM | 516 | 530 | 545 | 395 |
| 6FDA-6FpDA | 524 | 538 | 558 | 323 |
| 6FDA-CARDO | 543 | 555 | 553 | 393 |
| 6FDA-ABL-21 | 512 | 536 | 597 | 348 |
| 6FDA-DAM/6FpDA (1:3) | 517 | 532 | 550 | 336 |
| 6FDA-DAM/CARDO (1:3) | 527 | 545 | 550 | 395 |
| 6FDA-DAM/ABL-21 (1:3) | 502 | 528 | 558, 585 | 352 |

The values of $T_{d5\%}$ and $T_{d10\%}$ depicted in Table 1 show that prepared membranes are all within a similar range of thermal stability, with a slight advantage recorded to 6FDA-DAM/CARDO (1:3).

The smooth region between 100 to 200° C. in all the TGA curves indicates the absence of residual solvents (m-cresol and DMF) used to prepare the co-polyimides and their corresponding membranes, respectively. The TGA first derivative known as DTG of FIG. 4C provides valuable information about the kinetics of degradation of the materials studied. The DTG curves depicted in FIG. 4C show that the fastest thermal decomposition of the prepared membranes occurs in a temperature range between 550 and 585° C. (see also Table 1). Moreover, the glass temperatures ($T_g$) of the prepared co-polymers are listed in Table 1. The differential scanning calorimetry (DSC) traces were recorded within a temperature range between 30° C. and 450° C. at a rate of 10° C./min. The temperature values shown in Table 1 were obtained after a second run. A first run was performed to remove the thermal history of the corresponding polymer, which was followed by a fast cooling using a liquid nitrogen cooling system before performing the second run.

Density values of prepared co-polyimides were measured using a Mettler Toledo XPE205 balance equipped with a density kit. Buoyant liquid used included cyclohexane at 20° C., where its density was measured to be d=0.777 g/cm$^3$. The density values reported in Table 2 are the average values of at least five different measurements, with error values (standard deviation) below 2%. These density measurements were used to calculate the fractional free volume (FFV) of the prepared co-polyimide membranes using a group contribution method.

TABLE 2

Density and fractional free volume (FFV) values of the prepared co-polyimides.

| Polyimide | $V_0$ (cm$^3$/g) | V (cm$^3$/g) | d (g/cm$^3$) | FFV |
| --- | --- | --- | --- | --- |
| 6FDA-DAM | 0.6038 | 0.7570 | 1.3211 | 0.2023 |
| 6FDA-6FpDA | 0.5648 | 0.6765 | 1.4781 | 0.1651 |
| 6FDA-CARDO | 0.6193 | 0.7587 | 1.3180 | 0.1840 |
| 6FDA-ABL-21 | 0.5537 | 0.6799 | 1.4927 | 0.1735 |
| 6FDA-DAM/6FpDA (1:3) | 0.5746 | 0.6866 | 1.4564 | 0.1632 |
| 6FDA-DAM/CARDO (1:3) | 0.6154 | 0.7532 | 1.3277 | 0.1829 |
| 6FDA-DAM/ABL-21 (1:3) | 0.5662 | 0.6807 | 1.4691 | 0.1681 |

The reported FFV values of the corresponding homo-polymers are in line with their gas transport properties. The high FFV value in general leads to a relatively high permeability value, which is the case of 6FDA-DAM (0.2023) which is being used here, in part, as a permeability enhancing moiety. Due in part to the higher ratio of 6FpDA, CARDO, and ABL-21 relative to DAM (3:1), the corresponding random co-polymers have their FFV values similar to their corresponding homo-polymers. Such FFV values help maintain a relatively high CO$_2$/CH$_4$ selectivity. Co-polyimides disclosed here advantageously maintain relatively high values of permeability and selectivity.

Co-polyimide dense film membranes were prepared as follow: Dense films were prepared by a solution casting method. A 2-3 wt. % polymer solution was prepared in chloroform or dimethyl formamide (DMF) and the solution was filtered through a 0.45 µm filter. The solution was then cast onto a dry clean Petri dish and left to evaporate at room temperature under a clean nitrogen enriched environment overnight in the case of membrane made from chloroform. The film was then slowly heated in an oven under a slow nitrogen flow to about 60° C. for about 24 hours. However in the case of membrane made with DMF, the solution was covered with perforated aluminum foil and was left in the oven at 70° C. under a clean nitrogen enriched environment for about 24 hours. After being dried completely, the resulting films were finally dried in a vacuum oven at 150° C. overnight to remove any residual solvent, and then, the membranes were cooled to room temperature and peeled off from Petri dishes after soaking in deionized water for about 15 mins. The membrane was then dried at ambient temperature under a clean nitrogen environment for about 8 hours to remove any residual water.

Embodiments of the dense film membranes here are dense flat sheets, and do not include or are operable in the absence of asymmetric hollow fiber membranes.

Example 5: Evaluation of the $CO_2/CH_4$; $He/CH_4$; and $N_2/CH_4$ Pure Gas Separation Performance of 6FDA-DAM/CARDO (1:3); 6FDA-DAM/6FpDA (1:3) and 6FDA-DAM/ABL-21 (1:3) Co Polyimide Membranes Prepared in Examples 1-3

The permeability coefficients of pure gases, including He, $CO_2$, $CH_4$ and $N_2$, along with ideal selectivities of gas pairs, including $He/CH_4$, $N_2/CH_4$, and $CO_2/CH_4$, were identified by passing the gases through the series of co-polyimide membranes 6FDA-DAM/CARDO (1:3); 6FDA-DAM/6FpDA (1:3); and 6FDA-DAM/ABL-21 (1:3). Upstream pressures of up to 300 psig and temperatures up to 35° C. were studied and the results are shown in Tables 3-6. The permeation properties of all penetrant gases depicted are an average of at least two or more measurements, and error in permeability coefficients is less than ±5% of the values shown.

Pure gas permeability values of about 94 and 132 Barrers for $CO_2$ and He, respectively, and $CO_2/CH_4$ and $He/CH_4$ selectivities of about 37 and 52, respectively, were obtained for the random copolymer 6FDA-DAM/6FpDA (1:3), which are similar to target performances being sought for industrial acid gas separations and helium recovery from natural gas applications. Similar separation performance was obtained for the random copolymer 6FDA-DAM/CARDO (1:3), with permeability values of 119 and 120 Barrers for $CO_2$ and He, respectively, and $CO_2/CH_4$ and $He/CH_4$ selectivities of about 30 and 31, respectively. Moreover, random copolymer 6FDA-DAM/ABL-21 (1:3) exhibits the permeability values of about 90 and 129 Barrers for $CO_2$ and He, respectively, and $CO_2/CH_4$ and $He/CH_4$ selectivities of about 36 and 52, respectively. These values and separation performances exhibited by the co-polyimides are advantageous as compared to the values obtained in some high performance polymeric membranes.

As shown in Tables 4-6 for all the co-polyimide membranes, pure gas permeability coefficients of most of the penetrants, including He, $CO_2$, $CH_4$ and $N_2$, stay relatively constant or slightly increase (especially He and $CO_2$) with increase in feed pressure up to a feed pressure of about 300 psig. However, the membranes showed slight decrease in $CO_2/CH_4$ selectivities; while $He/CH_4$ selectivities were found to slightly increase as depicted in the tables. Furthermore, in addition to being selective to both $CO_2$ and He, these co-polyimides are also selective to $N_2$ as compared to methane and thus could simultaneously permeate both acid gas and $N_2$, while keeping methane in the high-pressure feed stream.

Example 6: Evaluation of the $CO_2/CH_4$; $N_2/CH_4$; and $C_2H_6/CH_4$ Mixed Gas Separation Performance of the 6FDA-DAM/CARDO (1:3); 6FDA-DAM/6FpDA (1:3); and 6FDA-DAM/ABL-21 (1:3) Co Polyimide Membranes Prepared in Examples 1-3

Permeability properties of quaternary gas mixtures consisting of 10, 59, 30, and 1 vol. % $CO_2$, $CH_4$, $N_2$, and $C_2H_6$, respectively, through the co-polyimide membranes were studied at different upstream pressures and are summarized in Tables 7-9 for the random co-polyimide membranes 6FDA-DAM/CARDO (1:3); 6FDA-DAM/6FpDA (1:3) and 6FDA-DAM/ABL-21 (1:3).

$CO_2$ permeability and $CO_2/CH_4$ selectivity reduced to about 68 Barrer and 30, respectively, for random co-polyimide 6FDA-DAM/6FpDA (1:3); about 57 Barrer and 29, respectively, for the random co-polyimide 6FDA-DAM/CARDO (1:3); and about 48 Barrer and 33, respectively, for the random co-polyimide 6FDA-DAM/ABL-21 (1:3) at an elevated pressure of 800 psig. These values are still quite advantageous for natural gas separations, especially at this elevated pressure of 800 psig.

Example 7: Evaluation of the $CO_2/CH_4$ and $H_2S/CH_4$ Sour Mixed Gas Separation Performance of the 6FDA-DAM/CARDO (1:3); 6FDA-DAM/6FpDA (1:3); and 6FDA-DAM/ABL-21 (1:3) Co Polyimide Membranes Prepared in Examples 1-3

The permeation properties of simulated sour gas mixtures consisting of 10, 57-59, 10, 1-3, and 20 vol. % of $CO_2$, $CH_4$, $N_2$, $C_2H_6$, and $H_2S$, respectively, through the membranes were studied at different gas feed pressures as shown in Table 10-12. Up to a maximum of 20 vol. % $H_2S$ in the feed gas was applied to the membranes. The $CO_2/CH_4$ and $H_2S/CH_4$ ideal selectivities obtained for the random co-polyimide 6FDA-DAM/6FpDA (1:3) are up to about 29 and 19, respectively; while $CO_2$ and $H_2S$ permeabilities are up to about 80 and 50 Barrers, respectively (Table 10). Similarly for the random co-polyimide 6FDA-DAM/CARDO (1:3), $CO_2/CH_4$ and $H_2S/CH_4$ ideal selectivities are up to about 19 and 21, respectively, while $CO_2$ and $H_2S$ permeabilities are up to about 48 and 51 Barrers, respectively (Table 11).

In addition, random co-polyimide membrane 6FDA-DAM/ABL-21 (1:3) exhibits $CO_2/CH_4$ and $H_2S/CH_4$ ideal selectivities of up to about 26 and 13, respectively, while $CO_2$ and $H_2S$ permeabilities are up to about 51 and 26 Barrers, respectively (Table 12). These values and separation performances exhibited by the co-polyimides are advantageous as compared to the values obtained in some high performance polymeric membranes. One important point to note is that at moderate feed pressure and up to 20 vol. % $H_2S$ in a feed gas mixture, ideal selectivities and permeabilities are still moderate in the co-polyimides. Moreover, the $CO_2/CH_4$ selectivity of the co-polyimides does not degrade to anywhere near the same extent as was reported for cellulose acetate (CA), even under much more aggressive environments. Stability at moderate pressures and high $H_2S$ concentration is impressive and unique as well as surprising and unexpected.

TABLE 3

Pure gas permeability (Barrer) and selectivity coefficients in the random 6FDA-DAM-type co-polyimide membranes measured at 100 psig feed pressure and at 35° C.

| Polymer Name | He | $N_2$ | $CH_4$ | $CO_2$ | $He/CH_4$ | $N_2/CH_4$ | $CO_2/CH_4$ |
|---|---|---|---|---|---|---|---|
| 6FDA-DAM | 332 | 35 | 24 | 522 | 13.78 | 1.44 | 21.64 |
| 6FDA-6FpDA | 133 | 3.4 | 1.5 | 66.5 | 88.33 | 2.27 | 44.33 |
| 6FDA-CARDO | 100 | 3.2 | 2.2 | 80.0 | 45.45 | 1.45 | 36.36 |
| 6FDA-ABL-21 | 108 | 2.5 | 1.2 | 46.4 | 93.57 | 2.17 | 40.35 |
| 6FDA-DAM/ 6FpDA (1:3) | 132 | 4.8 | 2.6 | 93.5 | 51.57 | 1.88 | 36.67 |
| 6FDA-DAM/ CARDO (1:3) | 120 | 5.6 | 3.9 | 119 | 30.74 | 1.42 | 30.49 |
| 6FDA-DAM/ ABL-21 (1:3) | 129 | 5.1 | 2.5 | 89.6 | 51.60 | 2.04 | 35.84 |

TABLE 4

Pure gas permeation properties of random co-polyimide 6FDA-DAM/6FpDA (1:3) membranes at 35° C.

| Pressure | Permeability (Barrer) | | | | Selectivity | | |
|---|---|---|---|---|---|---|---|
| (psig) | $CO_2$ | $CH_4$ | He | $N_2$ | $CO_2/CH_4$ | $He/CH_4$ | $N_2/CH_4$ |
| 100 | 105 | 2.60 | 132 | 4.8 | 40.35 | 50.53 | 1.84 |
| 200 | 105 | 3.31 | 155 | 5.6 | 31.70 | 46.81 | 1.69 |
| 300 | 118 | 4.02 | 170 | 6.4 | 29.32 | 42.15 | 1.59 |

TABLE 5

Pure gas permeation properties of random co-polyimide 6FDA-DAM/CARDO (1:3) membranes at 35° C.

| Pressure | Permeability (Barrer) | | | | Selectivity | | |
|---|---|---|---|---|---|---|---|
| (psig) | $CO_2$ | $CH_4$ | He | $N_2$ | $CO_2/CH_4$ | $He/CH_4$ | $N_2/CH_4$ |
| 100 | 113 | 3.90 | 120 | 5.61 | 28.82 | 30.72 | 1.44 |
| 200 | 113 | 3.55 | 152 | 6.51 | 31.84 | 42.93 | 1.83 |
| 300 | 117 | 4.02 | 169 | 7.07 | 28.97 | 42.14 | 1.76 |

TABLE 6

Pure gas permeation properties of random co-polyimide 6FDA-DAM/ABL-21 (1:3) membranes at 35° C.

| Pressure | Permeability (Barrer) | | | | Selectivity | | |
|---|---|---|---|---|---|---|---|
| (psig) | $CO_2$ | $CH_4$ | He | $N_2$ | $CO_2/CH_4$ | $He/CH_4$ | $N_2/CH_4$ |
| 100 | 100 | 2.51 | 129 | 5.11 | 39.91 | 51.48 | 2.04 |
| 200 | 95.5 | 2.74 | 155 | 5.82 | 34.80 | 56.55 | 2.12 |
| 300 | 100 | 2.86 | 167 | 6.33 | 34.92 | 58.54 | 2.21 |

TABLE 7

Mixed gases permeability and selectivity coefficients in the random co-polyimide 6FDA-DAM/6FpDA (1:3) membrane as a function of feed pressure at 22° C. using a gas mixture containing 10, 60, and 30 vol. % of $CO_2$, $CH_4$ and $N_2$, respectively.

| Pressure | Permeability (Barrer) | | | Ideal selectivity | |
|---|---|---|---|---|---|
| (psig) | $CO_2$ | $CH_4$ | $N_2$ | $CO_2/CH_4$ | $N_2/CH_4$ |
| 100 | 86.23 | 3.90 | 5.92 | 22.09 | 1.52 |
| 200 | 105.0 | 2.79 | 4.33 | 37.61 | 1.55 |
| 300 | 102.7 | 2.64 | 4.03 | 38.86 | 1.53 |
| 400 | 93.48 | 2.60 | 3.92 | 35.89 | 1.51 |
| 500 | 87.32 | 2.56 | 3.82 | 34.11 | 1.49 |
| 600 | 68.49 | 2.02 | 3.00 | 33.88 | 1.49 |
| 800 | 68.15 | 2.29 | 3.34 | 29.82 | 1.46 |

TABLE 8

Mixed gases permeability and selectivity coefficients in the random co-polyimide 6FDA-DAM/CARDO (1:3) membrane as function of feed pressure at 22° C. using a gas mixture containing 10, 60, and 30 vol. % of $CO_2$, $CH_4$ and $N_2$, respectively.

| Pressure | Permeability (Barrer) | | | Ideal selectivity | |
|---|---|---|---|---|---|
| (psig) | $CO_2$ | $CH_4$ | $N_2$ | $CO_2/CH_4$ | $N_2/CH_4$ |
| 200 | 65.95 | 1.31 | 1.32 | 50.29 | 1.01 |
| 400 | 66.47 | 1.79 | 1.75 | 37.20 | 0.98 |
| 600 | 60.30 | 1.90 | 1.82 | 31.73 | 0.96 |
| 800 | 57.09 | 1.99 | 1.90 | 28.68 | 0.95 |

TABLE 9

Mixed gases permeability and selectivity coefficients in the random co-polyimide 6FDA-DAM/ABL-21 (1:3) membrane as function of feed pressure at 22° C. using gas mixture containing 10, 60, and 30 vol. % of $CO_2$, $CH_4$ and $N_2$, respectively.

| Pressure | Permeability (Barrer) | | | Ideal selectivity | |
|---|---|---|---|---|---|
| (psig) | $CO_2$ | $CH_4$ | $N_2$ | $CO_2/CH_4$ | $N_2/CH_4$ |
| 200 | 84.54 | 1.91 | 3.09 | 44.20 | 1.62 |
| 400 | 58.39 | 1.40 | 2.25 | 41.85 | 1.62 |
| 600 | 50.75 | 1.38 | 2.21 | 36.76 | 1.60 |
| 800 | 48.18 | 1.44 | 2.31 | 33.47 | 1.60 |

TABLE 10

Sour mixed gas permeability and selectivity coefficients in the random co-polyimide 6FDA-DAM/6FpDA (1:3) membrane measured at 22° C. and using sour feed gas mixture containing 10, 57-59, 10, 1-3, and 20 vol. % of $CO_2$, $CH_4$, $N_2$, $C_2H_6$ and $H_2S$, respectively.

| $H_2S$ comp. | $C_2H_6$ comp | Total feed pressure | Permeability (Barrer) | | | | | Ideal selectivity | |
|---|---|---|---|---|---|---|---|---|---|
| vol. % | vol. % | (psig) | $N_2$ | $CH_4$ | $C_2H_6$ | $CO_2$ | $H_2S$ | $CO_2/CH_4$ | $H_2S/CH_4$ |
| 20.0 | 1.0 | 200 | 3.9 | 2.7 | 3.4 | 80.2 | 50.4 | 29.49 | 18.54 |
| | | 350 | 3.0 | 2.4 | 3.0 | 61.0 | 43.7 | 25.14 | 18.00 |
| | | 500 | 3.5 | 3.3 | 4.1 | 69.7 | 51.9 | 21.30 | 15.88 |
| 20.0 | 3.0 | 350 | 2.8 | 2.9 | 2.3 | 77.7 | 38.2 | 27.14 | 13.34 |

TABLE 11

Sour mixed gas permeability and selectivity coefficients
in the random co-polyimide 6FDA-DAM/CARDO (1:3) membrane
measured at 22° C. and using sour feed gas mixture containing 10, 59,
10, 1, and 20 vol. % of $CO_2$, $CH_4$, $N_2$, $C_2H_6$, and $H_2S$, respectively.

| $H_2S$ comp. vol. % | $C_2H_6$ comp vol. % | Total feed pressure (psig) | Permeability (Barrer) | | | | | Ideal selectivity | |
|---|---|---|---|---|---|---|---|---|---|
| | | | $N_2$ | $CH_4$ | $C_2H_6$ | $CO_2$ | $H_2S$ | $CO_2/CH_4$ | $H_2S/CH_4$ |
| 20.0 | 1.0 | 350 | 2.0 | 2.5 | 2.7 | 47.5 | 51.2 | 19.21 | 20.71 |
| | | 500 | 2.2 | 2.9 | 3.0 | 46.3 | 54.1 | 16.23 | 18.95 |

TABLE 12

Sour mixed gas permeability and selectivity coefficients in the
random co-polyimide 6FDA-DAM/ABL-21 (1:3) membrane
measured at 22° C. and using sour feed gas mixture containing 10; 59;
10; 1 and 20 vol. % of $CO_2$, $CH_4$, $N_2$, $C_2H_6$ and $H_2S$, respectively.

| $H_2S$ comp. vol. % | $C_2H_6$ comp vol. % | Total feed pressure (psig) | Permeability (Barrer) | | | | | Ideal selectivity | |
|---|---|---|---|---|---|---|---|---|---|
| | | | $N_2$ | $CH_4$ | $C_2H_6$ | $CO_2$ | $H_2S$ | $CO_2/CH_4$ | $H_2S/CH_4$ |
| 20.0 | 1.0 | 350 | 2.4 | 2.0 | 2.7 | 50.5 | 26.1 | 25.74 | 13.32 |
| | | 500 | 2.3 | 2.0 | 3.0 | 47.2 | 27.3 | 23.57 | 13.65 |

Embodiments of the disclosure show membrane-based gas separation applications particularly for acid gas separation and helium recovery from natural gas using unique 6FDA-DAM-type aromatic co-polyimide membranes. The membranes exhibit advantageous pure and gas mixture permeation properties, with pure gas $CO_2$ permeability in the range of about 105-118 Barrer and $CO_2/CH_4$ selectivity of up to about 40 at 35° C. and a feed pressure of up to 300 psig.

Similarly, pure gas He permeability in the range of about 132-170 Barrer and $He/CH_4$ selectivity of up to about 52 were obtained with the same experimental conditions. Furthermore, the permeation properties of simulated sour gas mixtures consisting of 10, 57-59, 10, 1-3, and 20 vol. % of $CO_2$, $CH_4$, $N_2$, $C_2H_6$ and $H_2S$, respectively, through exemplified membranes were studied, and up to 20 vol. % $H_2S$ in the feed gas was applied to the membranes.

The $CO_2/CH_4$ and $H_2S/CH_4$ ideal selectivities obtained for the random co-polyimide 6FDA-DAM/6FpDA (1:3) are up to about 29 and 19, respectively, while $CO_2$ and $H_2S$ permeabilities are up to about 80 and 50 Barrers, respectively. Similarly for the random co-polyimide 6FDA-DAM/CARDO (1:3), $CO_2/CH_4$ and $H_2S/CH_4$ ideal selectivities are up to about 19 and 21, respectively, while $CO_2$ and $H_2S$ permeabilities are up to about 48 and 51 Barrers, respectively. These values and separation performances exhibited by the co-polyimides are advantageous as compared to the values obtained in some high performance polymeric membranes. At moderate feed pressures and up to 20 vol. % $H_2S$ in a feed gas mixture, ideal selectivities and permeabilities are still moderate in the co-polyimides. Moreover, $CO_2/CH_4$ selectivity of the co-polyimides does not degrade to anywhere near the same extent as was reported for cellulose acetate (CA), even under more aggressive environments here. This stability at moderate pressures and high $H_2S$ concentration is impressive, unique, surprising, and unexpected.

Another unique results obtained is the co-polyimide membranes are not only acid gas selective, but also selective to $N_2$ as compared to $CH_4$ (i.e., the permeation of $N_2$ in aromatic polyimides is higher than $CH_4$). This provides a separation advantage and energy is being saved as the membrane simultaneously permeates both acid gas and $N_2$, while keeping $CH_4$ on the high pressure side of the membrane.

The singular forms "a," "an," and "the" include plural referents, unless the context clearly dictates otherwise.

In the drawings and specification, there have been disclosed embodiments of apparatus, systems, and methods for aromatic co-polyimide membranes for sour natural gas separation, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A membrane for separating the components of a sour natural gas feed, the membrane comprising:
   at least three distinct moieties polymerized together, the moieties including a 2,2'-bis(3,4-dicarboxyphenyl) hexafluoropropane dianhydride (6FDA) based moiety; a 2,4,6-trimethyl-m-phenylenediamine (DAM) based moiety; and at least one component selected from the group consisting of: a 4,4'-(hexafluoroisopropylidene) dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene) dianiline based moiety,
   wherein the molar ratio of the DAM based moiety to the at least one component selected from the group is about 1:3 to control fractional free volume of the membrane and to maintain the fractional free volume of the membrane similar to a fractional free volume of a homo-polyimide comprising 6FDA and the at least one component selected from the group to maintain suitable values of permeability and selectivity for sour natural gas separations.

2. The membrane according to claim 1, where the membrane comprises random co-polymers.

3. The membrane according to claim 2, where the membrane comprises the 6FpDA based moiety.

4. The membrane according to claim 2, where the membrane comprises the CARDO based moiety.

5. The membrane according to claim 2, where the membrane comprises the ABL-21 based moiety.

6. The membrane according to claim 1, where the membrane comprises block co-polymers.

7. The membrane according to claim 6, where the membrane comprises the 6FpDA based moiety.

8. The membrane according to claim 6, where the membrane comprises the CARDO based moiety.

9. The membrane according to claim 6, where the membrane comprises the ABL-21 based moiety.

10. The membrane according to claim 6, where the block co-polymers include a polymer block of length L of the 6FDA and the DAM based moieties, and include a polymer block of length M of the 6FDA and the 6FpDA based moieties, and a block length ratio of L to M is about between (1,000-20,000) to (1,000-20,000).

11. The membrane according to claim 6, where the block co-polymers include a polymer block of length L of the 6FDA and the DAM based moieties, and include a polymer block of length M of the 6FDA and the CARDO based moieties, and a block length ratio of L to M is about between (1,000-20,000) to (1,000-20,000).

12. The membrane according to claim 6, where the block co-polymers include a polymer block of length L of the 6FDA and the DAM based moieties, and include a polymer block of length M of the 6FDA and the ABL-21 based moieties, and a block length ratio of L to M is about between (1,000-20,000) to (1,000-20,000).

13. A method of gas separation, the method comprising the step of:
applying the membrane of claim 1 to separate at least 2 components of a mixed gas stream.

14. The method according to claim 13, where feed pressure of the mixed gas stream to a feed side of the membrane is up to about 800 psig and $H_2S$ content of the mixed gas stream is up to about 20 volume percent.

15. The method according to claim 13, where the mixed gas stream comprises $CO_2$, $CH_4$, $N_2$, $C_2H_6$, and $H_2S$.

16. A method for making a membrane for separating components of a sour natural gas feed, the method comprising the steps of:
combining at least three different monomers to form a co-polyimide, the monomers including 2,2'-bis(3,4-dicarboxyphenyl)hexafluoropropane dianhydride (6FDA); 2,4,6-trimethyl-m-phenylenediamine (DAM); and at least one component selected from the group consisting of: 4,4'-(hexafluoroisopropylidene)dianiline (6FpDA); 9,9-bis(4-aminophenyl) fluorene (CARDO); 2,3,5,6-tetramethyl-1,4-phenylenediamine (durene diamine); 2,2'-bis(trifluoromethyl)benzidine (ABL-21); 3,3'-dihydroxybenzidine; and 3,3'-(hexafluoroisopropylidene)dianiline; and
preparing a dense film from the co-polyimide using a solution casting process,
wherein the molar ratio of the DAM based moiety to the at least one component selected from the group is about 1:3 to control fractional free volume of the membrane and to maintain the fractional free volume of the membrane similar to a fractional free volume of a homo-polyimide comprising 6FDA and the at least one component selected from the group to maintain suitable values of permeability and selectivity for sour natural gas separations.

17. A method of gas separation, the method comprising the step of:
using the dense film of claim 16 to separate at least 2 components of a mixed gas stream.

18. The method according to claim 16, where the step of combining is carried out to create random co-polymers.

19. The method according to claim 18, where the step of combining includes combining the 6FDA, the DAM, and the 6FpDA.

20. The method according to claim 18, where the step of combining includes combining the 6FDA, the DAM, and the CARDO.

21. The method according to claim 18, where the step of combining includes combining the 6FDA, the DAM, and the ABL-21.

22. The method according to claim 16, where the step of combining is carried out to create block co-polymers.

23. The method according to claim 22, where the step of combining includes combining the 6FDA, the DAM, and the 6FpDA.

24. The method according to claim 22, where the step of combining includes combining the 6FDA, the DAM, and the CARDO.

25. The method according to claim 22, where the step of combining includes combining the 6FDA, the DAM, and the ABL-21.

26. A membrane for separating the components of a sour natural gas feed, the membrane comprising:
at least three distinct moieties polymerized together, the moieties including a dianhydride selected from the group consisting of: a 2,2'-bis(3,4-dicarboxyphenyl)hexafluoropropane dianhydride (6FDA) based moiety; a benzophenone-3,3', 4,4'-tetracarboxylic dianhydride (BTDA) based moiety; and a pyromellitic dianhydride (PMDA) based moiety;
a 2,4,6-trimethyl-m-phenylenediamine (DAM) based moiety; and
at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety,
wherein the molar ratio of the DAM based moiety to the at least one component selected from the group consisting of the 6FpDA based moiety, the CARDO based moiety, the durene diamine based moiety, the ABL-21 based moiety, the 3,3'-dihydroxybenzidine based moiety, and the 3,3'-(hexafluoroisopropylidene)dianiline based moiety is about 1:3 to control fractional free volume of the membrane and to maintain the fractional free volume of the membrane similar to a fractional free volume of a homo-polyimide comprising 6FDA and the at least one component selected from the group consisting of the 6FpDA based moiety, the CARDO based moiety, the durene diamine based moiety, the ABL-21 based moiety, the 3,3'-dihydroxybenzidine based moiety, and the 3,3'-(hexafluoroisopropylidene) dianiline based moiety to maintain suitable values of permeability and selectivity for sour natural gas separations.

* * * * *